United States Patent [19]
Maddox

[11] Patent Number: 6,085,979
[45] Date of Patent: Jul. 11, 2000

[54] OFF-SCALE ITEM SENSING APPARATUS AND METHOD FOR A BAR CODE READER

[75] Inventor: Craig E. Maddox, Lilburn, Ga.

[73] Assignee: NCR Corporation, Dayton, Ohio

[21] Appl. No.: 09/102,843

[22] Filed: Jun. 23, 1998

[51] Int. Cl.$^7$ .............................. G06K 7/10; G06K 15/10
[52] U.S. Cl. ..................... 235/462.13; 235/383; 177/50; 177/245
[58] Field of Search .................................... 235/383, 454, 235/462.13, 462.14, 462.31, 462.43, 462.48, 462.01; 177/25.15, 45, 50, 245

[56] References Cited

U.S. PATENT DOCUMENTS

| | | | |
|---|---|---|---|
| 3,265,140 | 8/1966 | Mayer | 177/46 |
| 4,192,394 | 3/1980 | Simpson | 177/45 |
| 4,628,186 | 12/1986 | Bergemann et al. | 219/497 |
| 4,656,344 | 4/1987 | Mergenthaler et al. | 235/383 X |
| 4,716,281 | 12/1987 | Amacher et al. | 235/383 |
| 5,058,691 | 10/1991 | Sela | 177/50 |
| 5,086,879 | 2/1992 | Latimer et al. | 186/61 |
| 5,123,494 | 6/1992 | Schneider | 177/50 |
| 5,128,753 | 7/1992 | Lemelson | 358/101 |
| 5,139,100 | 8/1992 | Brauneis | 177/25.15 |
| 5,143,164 | 9/1992 | Nahar | 177/50 |
| 5,285,022 | 2/1994 | Antone | 177/253 |
| 5,307,198 | 4/1994 | Sullivan | 359/196 |
| 5,340,950 | 8/1994 | Brandorff et al. | 177/145 |
| 5,459,308 | 10/1995 | Detwiler et al. | 235/467 |
| 5,642,103 | 6/1997 | Tokuda et al. | 235/380 X |
| 5,747,744 | 5/1998 | Kraft et al. | 177/25.15 |
| 5,834,708 | 11/1998 | Svetal et al. | 235/462.43 |

*Primary Examiner*—Donald Hajec
*Assistant Examiner*—Jared J. Fureman
*Attorney, Agent, or Firm*—Paul W. Martin

[57] ABSTRACT

An off-scale item sensing apparatus and method which uses a light beam around a portion of the periphery of a weigh plate. The system includes a source for producing a light beam, a plurality of mirrors for directing the light beam along a path around a periphery of the weigh plate, a detector for receiving the light beam, and an alarm coupled to the detector for alerting an operator when the item is placed in the path of the light beam.

9 Claims, 4 Drawing Sheets

6,085,979

OFF-SCALE ITEM SENSING APPARATUS AND METHOD FOR A BAR CODE READER

BACKGROUND OF THE INVENTION

The present invention relates to bar code readers and more specifically to an off-scale item sensing apparatus and method for a bar code reader.

Bar code readers are well known for their usefulness in retail checkout and inventory control. Bar code readers mounted within checkout counters generally employ a laser diode, the light from which is focused and collimated to produce a scanning beam. An optical transceiver directs the beam against a mirrored polygon or spinner and then against a plurality of stationary mirrors, and collects the beam after it is reflected by a bar code label. A motor rotates the mirrored polygon, and a detector receives the returning beam. The pattern produced by such a bar code reader is characterized by lines oriented at various angles to one another.

Bar code readers also typically include a scale apparatus for measuring weights of produce and other items without bar codes. The scale apparatus typically includes a load cell and a weigh plate which rests on the load cell. The weigh plate is typically flush-mounted with the top surface of the checkout counter.

Unfortunately, a flush-mounted weigh plate exposes retailers to a risk of losing money from sales involving inaccurately weighed items. If an item rests partly on the top surface of the checkout counter, the scale records a weight less than the actual weight of the item.

Therefore, it would be desirable to provide an apparatus for a bar code reader which would detect an item that is not fully supported by the scale weigh plate and provide an indication to an operator of the bar code reader to relocate the item to a position totally supported by the weigh plate.

SUMMARY OF THE INVENTION

In accordance with the teachings of the present invention, an off-scale item sensing apparatus and method for a bar code reader is provided.

An off-scale item sensing apparatus and method which uses a light beam around a portion of the periphery of a weigh plate. The system includes a source for producing a light beam, a plurality of mirrors for directing the light beam along a path around a periphery of the weigh plate, a detector for receiving the light beam, and an alarm coupled to the detector for alerting an operator when the item is placed in the path of the light beam.

The method includes the steps of producing a light beam, directing the light beam along a path around a periphery of the weigh plate by a plurality of mirrors, a detecting non-receipt of the light beam by a detector, and alerting an operator that the item is placed in the path of the light beam by an alarm coupled to the detector.

It is a feature of the present invention that it uses a laser beam that is also used for scanning bar code labels.

It is accordingly an object of the present invention to provide an off-scale item sensing apparatus and method for a bar code reader.

It is another object of the present invention to provide an off-scale item sensing apparatus and method for a bar code reader which employs a laser beam.

It is another object of the present invention to provide an off-scale item sensing apparatus and method for a bar code reader which routes a laser beam around the periphery of a weigh plate and which senses when the beam is interrupted to produce an alarm.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
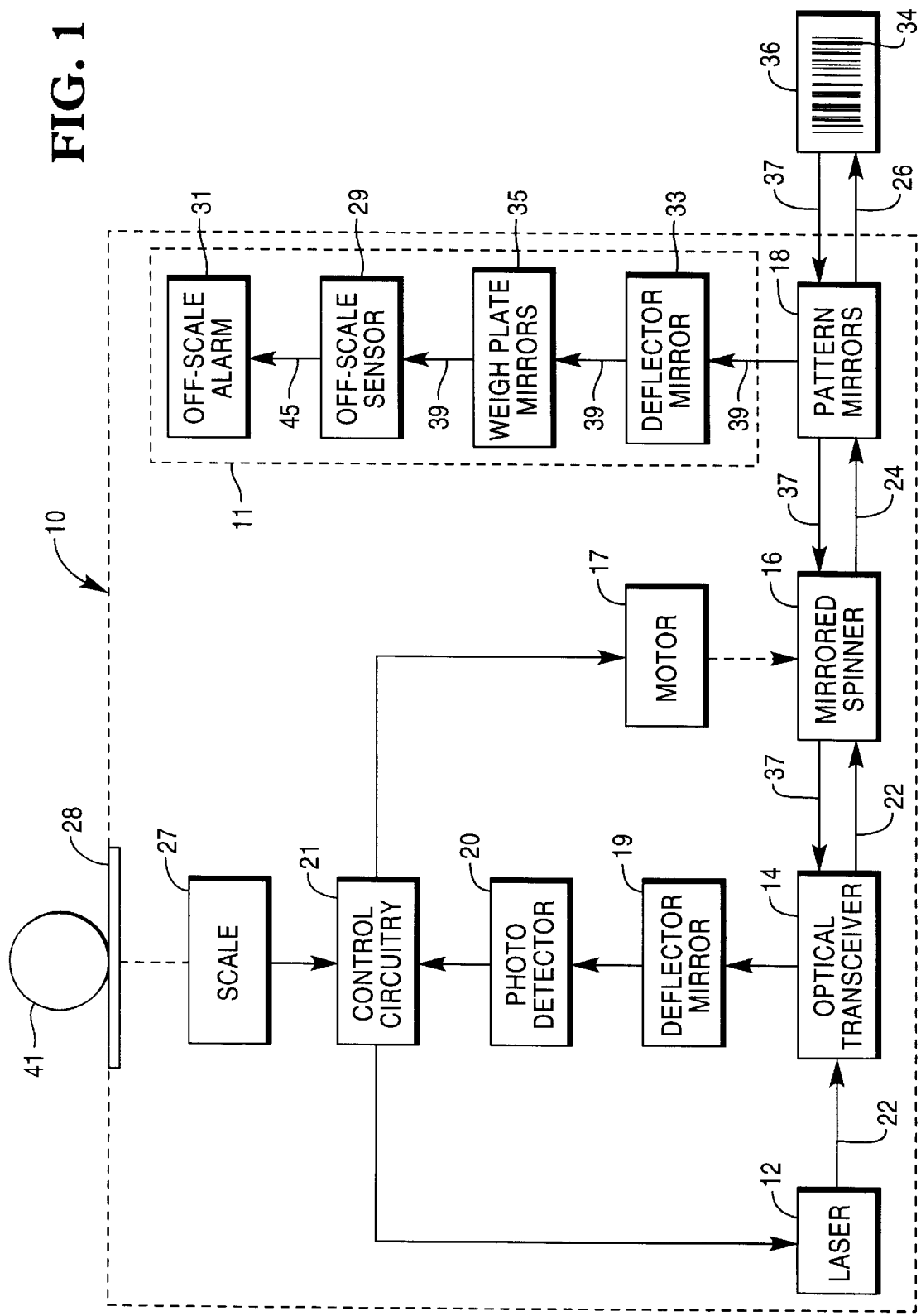
FIG. 1 is a block diagram of an optical bar code reader employing a first embodiment of the off-scale item sensing apparatus of the present invention.
Figure 3:
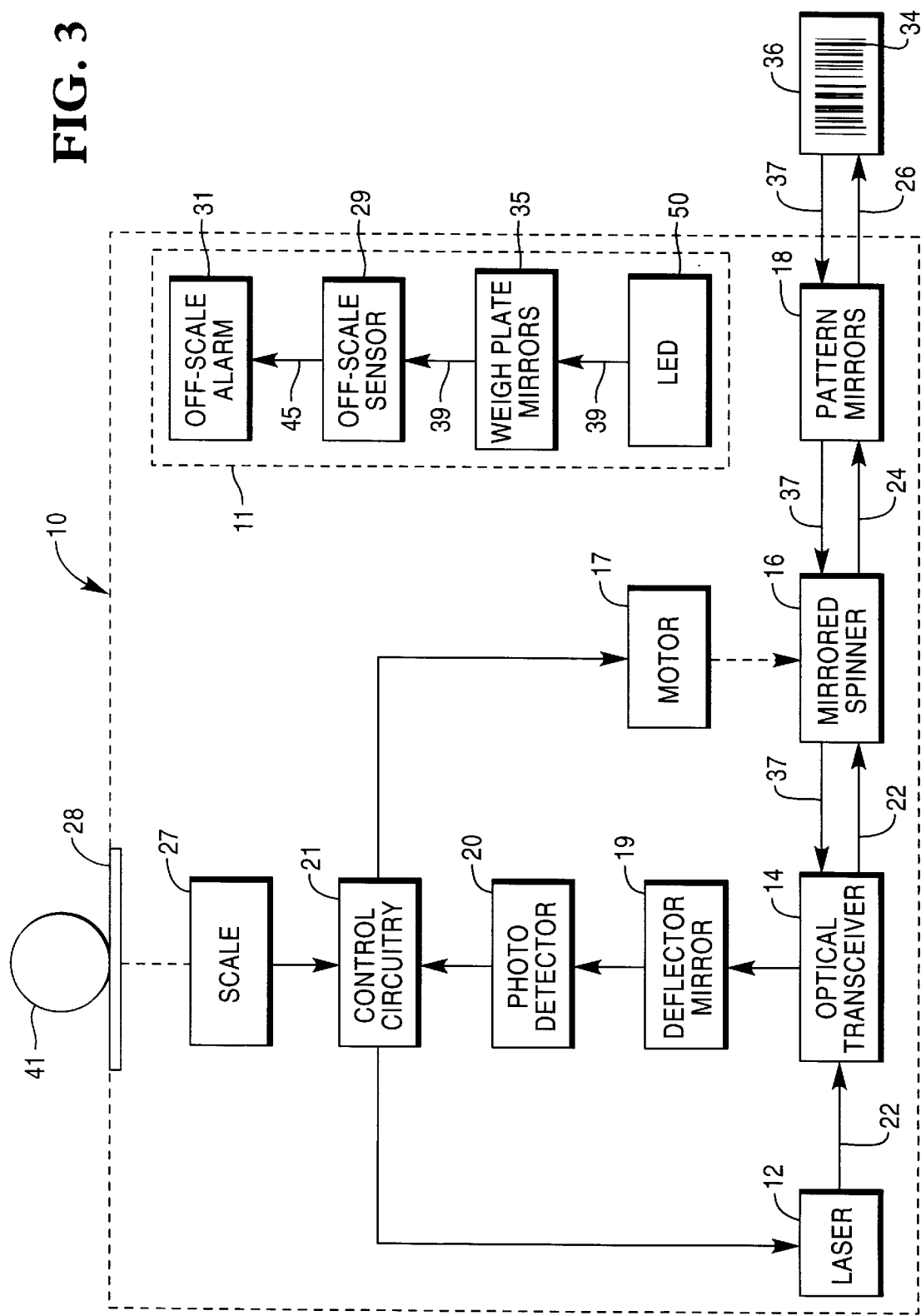
FIG. 3 is a block diagram of an optical bar code reader employing a second embodiment of the off-scale item sensing apparatus of the present invention.

Referring now to FIGS. 1 and 3, example bar code reader 10 is a dual-aperture bar code reader like the one disclosed in U.S. Pat. No. 5,459,308, which Applicant hereby incorporates by reference. However, the present invention also envisions that other types of bar code readers may be used, including conventional single-aperture bar code readers.

Example bar code reader 10 includes laser 12, optical transceiver 14, mirrored spinner 16, motor 17, pattern mirrors 18, deflector mirror 19, photodetector 20, control circuit 21, scale 27, and weigh plate 28. Under the present invention, bar code reader is also equipped with off-scale item sensing apparatus 11.

Laser 12 includes a laser diode or other suitable laser source. A focusing lens or lenses and a collimating aperture are also used to produce a focused and collimated laser beam 22.

Beam 22 passes through optical transceiver 14, which includes a mirrored collecting surface and an aperture for passing beam 22.

Beam 22 contacts mirrored spinner 16, which produces scanning beams 24.

Scanning beams 24 impact pattern mirrors 18, which produce a plurality of scan lines 26.

Some scan lines 26 pass through a substantially horizontal aperture 28 and some pass through a substantially vertical aperture 30 in bar code reader housing 32 on their way to bar code label 34 on merchandise item 36.

Reflected light 37 is redirected by pattern mirrors 18 towards spinner 16, which further directs it towards optical transceiver 14.

Optical transceiver 14 directs and focuses reflected light 37 at deflector mirror 19, which further directs reflected light 37 towards photodetector 20.

Photodetector 20 generates electrical signals representing the intensity of reflected light 37.

Control circuitry 21 decodes bar code label 34 and controls power to laser 12 and motor 17.

Scale 27 provides weight signals for produce and other items, such as item 41, whose price is determined in part by their weight. Scale 27 typically includes a load cell. Weigh plate 28 rests on scale 27 and supports item 41.

Figure 2:
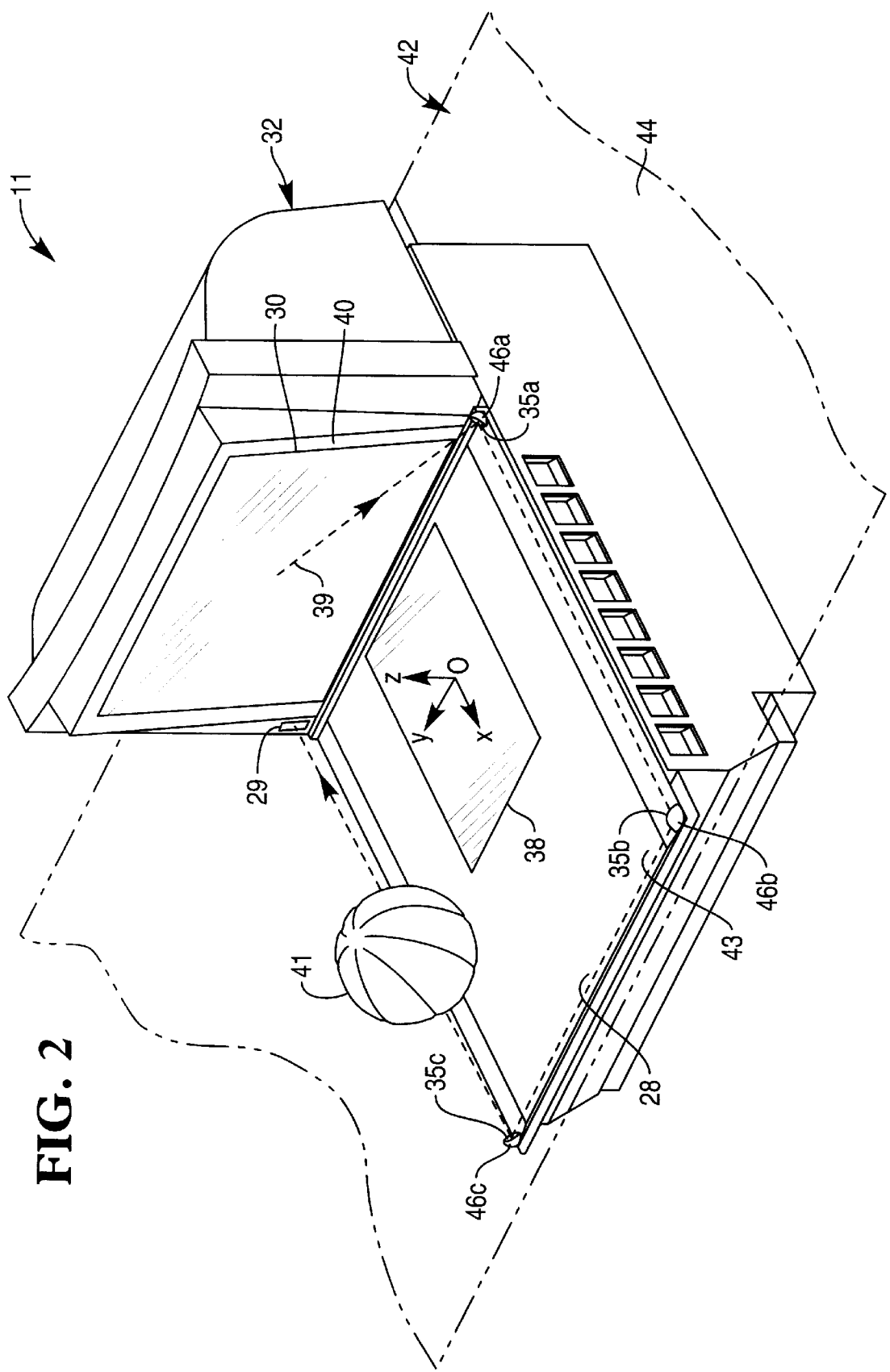
FIG. 2 is an exterior perspective view of the bar code reader of FIG. 1.
Figure 4:
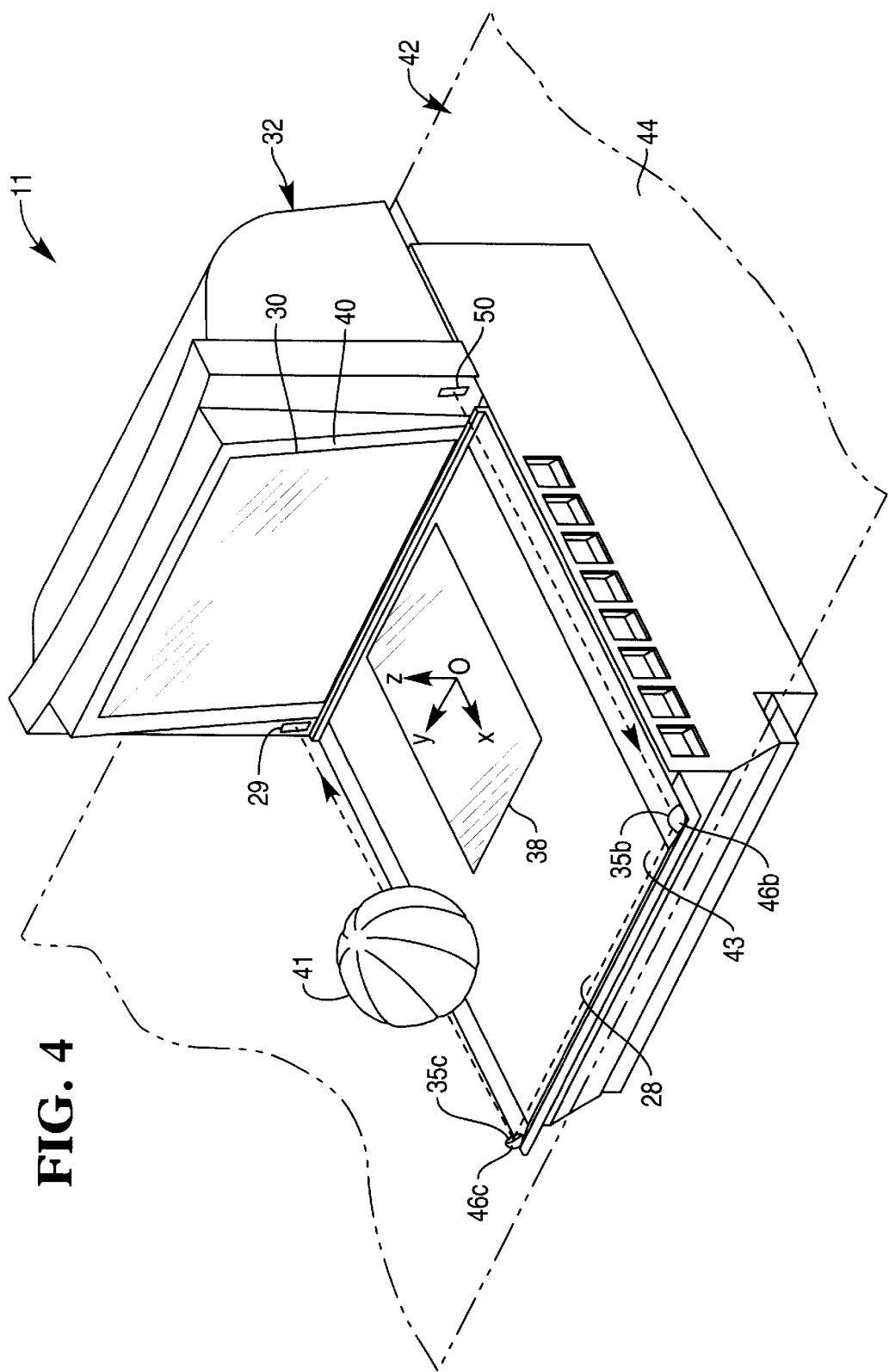
FIG. 4 is an exterior perspective view of the bar code reader of FIG. 3.

Off-scale item sensing apparatus 11 senses whether item 41 on scale weigh plate 38 is also resting on checkout counter 42 (FIGS. 2 and 4). A first embodiment (FIGS. 1 and 2) of the present invention uses part of the scan pattern laser light to perform off-scale monitoring. A second embodiment (FIGS. 3 and 4) uses a separate light source, such as a light emitting diode (LED) 50, for producing sensor beam 39.

With reference to FIGS. 1 and 2, off-scale item sensing apparatus 11 includes deflector mirror 33, weigh plate mirrors 35, off-scale sensor 29, and off-scale alarm 31.

One of pattern mirrors 18 produces sensor beam 39, which is deflected towards weigh plate mirrors 35 by deflector mirror 33.

Weigh plate mirrors 35*a–c* are located at corners of weigh plate 28 (FIG. 2) and serve to reflect sensor beam 39 around the periphery of weigh plate 28. Weigh plate mirror 35*c* (FIG. 2) reflects sensor beam towards off-scale sensor 29 within bar code reader 10.

Off-scale sensor 29 produces an alarm signal 45 if item 41 breaks sensor beam 39.

Off-scale alarm 31 produces a visual and/or audible indication to an operator in response to alarm signal 45.

Bar code reader 10 is shown in perspective within a checkout counter 42. Horizontal aperture 38 is located within weigh plate 28. Vertical aperture 30 is located within substantially vertical surface 40 of bar code reader housing 32 and faces an operator. Top surface 43 of weigh plate 28 is substantially flush with top surface 44 of checkout counter 42.

Weigh plate 28 includes raised portions 46*a–c* which contain weigh plate mirrors 35*a–c*. Raised portions 46*a–c* may be formed during manufacture of weigh plate 28 or attached with suitable fasteners or glues afterwards. Raised portions 46*a–c* are small in height and are contoured to minimize the possibility of catching operator clothing or merchandise items during use of bar code reader 10.

Weigh plate mirrors 35*b–c* are oriented at forty-five degree angles with respect to the sides of weigh plate 28 in order to direct sensor beam 39 along the periphery of weigh plate 28 towards off-scale sensor 29. Weigh plate mirror 35*a* is oriented at an angle sufficient to allow it to reflect an incoming laser beam from deflector mirror 33 towards weigh plate mirror 35*b*.

With reference to the second embodiment of FIGS. 3 and 4, off-scale item sensing apparatus 11 includes LED 50, weigh plate mirrors 35, off-scale sensor 29, and off-scale alarm 31.

LED 50 generates sensor beam 50.

Weigh plate mirrors 35, off-scale sensor 29, and off-scale alarm 31 operate as in the first embodiment.

Advantageously, both embodiments notify an operator if produce item 41 is partly resting on checkout counter 42.

Although the invention has been described with particular reference to certain preferred embodiments thereof, variations and modifications of the present invention can be effected within the spirit and scope of the following claims.

I claim:

1. An apparatus for sensing an item resting partly on a scale weigh plate of a bar code reader and partly on a checkout counter in which the bar code reader is mounted comprising:
   a source for producing a light beam;
   a plurality of mirrors for directing the light beam along a path around a periphery of the weigh plate;
   a detector for receiving the light beam; and
   an alarm coupled to the detector for alerting an operator when the item is placed in the path of the light beam;
   wherein the plurality of mirrors include a first mirror at a first corner of the weigh plate, a second mirror at a second corner of the weigh plate, a third mirror at a third corner of the weigh plate, and a fourth mirror within the bar code reader for directing the light beam at the first mirror;
   wherein the first mirror further directs the light beam along a first side of the weigh plate to the second mirror;
   wherein the second mirror further directs the light beam along a second side of the weigh plate to the third mirror; and
   wherein the third mirror further directs the light beam along a third side of the weigh plate to the detector.

2. The apparatus as recited in claim 1, wherein the source comprises a laser.

3. The apparatus as recited in claim 1, wherein the source comprises a light emitting diode.

4. A bar code reader within a checkout counter comprising:
   a scale assembly including a weigh plate for weighing an item;
   an apparatus for sensing placement of the item partly on the weigh plate and partly on the checkout counter including
   a source for producing a light beam;
   a plurality of mirrors for directing the light beam along a path around a periphery of the weigh plate;
   a detector for receiving the light beam; and
   an alarm coupled to the detector for alerting an operator when the item is placed in the path of the light beam;
   wherein the plurality of mirrors include a first mirror at a first corner of the weigh plate, a second mirror at a second corner of the weigh plate, a third mirror at a third corner of the weigh plate, and a fourth mirror within the bar code reader for directing the light beam at the first mirror;
   wherein the first mirror further directs the light beam along a first side of the weigh plate to the second mirror;
   wherein the second mirror further directs the light beam along a second side of the weigh plate to the third mirror; and
   wherein the third mirror further directs the light beam along a third side of the weigh plate to the detector.

5. A bar code reader within a checkout counter comprising:
   a scale assembly including a weigh plate for weighing a produce item;
   an apparatus for sensing placement of the produce item partly on the weigh plate and partly on the checkout counter including
   a first mirror at a first corner of the weigh plate;
   a second mirror at a second corner of the weigh plate;
   a third mirror at a third corner of the weigh plate;
   a detector adjacent a fourth corner of the weigh plate;
   a fourth mirror within the bar code reader for directing a laser beam at the first mirror, wherein the first mirror further directs the laser beam along a first side of the weigh plate to the second mirror, wherein the second mirror further directs the laser beam along a second side of the weigh plate to the third mirror, and wherein the third mirror further directs the laser beam along a third side of the weigh plate to the detector; and an alarm coupled to the detector for alerting an operator when the produce item blocks the laser beam at any one of the first, second, and third sides.

6. The bar code reader as recited in claim 5, further comprising:

a housing having a first aperture which is substantially horizontal, and a second aperture which is substantially vertical;

wherein the laser beam passes through the horizontal and vertical apertures to generate a multi-line scan pattern; and wherein the fourth mirror directs the laser beam through the vertical aperture.

7. A method of sensing placement of an item partly on a scale weigh plate of a bar code reader and partly on a checkout counter in which the bar code reader is mounted comprising the steps of:

producing a light beam;

directing the light beam at a second mirror on a first corner of the weigh plate by a first mirror within the bar code reader;

directing the light beam along a path around a periphery of the weigh plate by the second mirror and third and fourth mirrors, including the substeps of directing the light beam along a first side of the weigh plate to the third mirror by the second mirror;

directing the light beam along a second side of the weigh plate to the fourth mirror by the third mirror; and directing the light beam along a third side of the weigh plate to a detector by the fourth mirror;

a detecting non-receipt of the light beam by the detector; and alerting an operator that the item is placed in the path of the light beam by an alarm coupled to the detector.

8. An apparatus for sensing an item resting partly on a scale weigh plate of a bar code reader and partly on a checkout counter in which the bar code reader is mounted comprising:

a laser for producing a light beam;

a plurality of mirrors for directing the light beam along a path around a periphery of the weigh plate;

a detector for receiving the light beam; and an alarm coupled to the detector for alerting an operator when the item is placed in the path of the light beam;

wherein the plurality of mirrors include a first mirror at a first corner of the weigh plate, a second mirror at a second corner of the weigh plate, a third mirror at a third corner of the weigh plate, and a fourth mirror within the bar code reader for directing the light beam at the first mirror;

wherein the first mirror further directs the light beam along a first side of the weigh plate to the second mirror;

wherein the second mirror further directs the light beam along a second side of the weigh plate to the third mirror; and wherein the third mirror further directs the light beam along a third side of the weigh plate to the detector.

9. A bar code reader within a checkout counter comprising:

a housing having a first aperture which is substantially horizontal, and a second aperture which is substantially vertical;

a scale assembly including a weigh plate which contains the first aperture;

a laser which produces a light beam which passes through the horizontal and vertical apertures to generate a multi-line scan pattern;

an apparatus for sensing placement of the produce item partly on the weigh plate and partly on the checkout counter including a plurality of mirrors for directing the light beam along a path around a periphery of the weigh plate, including a first mirror within the housing which directs the light beam through the vertical aperture to another mirror on the weigh plate;

a detector in the housing which receives the light beam after it has been directed along the path around the periphery by the plurality of mirrors; and an alarm coupled to the detector for alerting an operator when the produce item blocks the light beam along the path around the periphery.

* * * * *